Sept. 29, 1964   F. C. COLLIN   3,150,961

PROCESS OF REDUCING METAL OXIDES

Filed Feb. 10, 1960

INVENTOR.
FREDERIK CHRISTEN COLLIN

BY

*Eyre, Mann & Lucas*
ATTORNEYS

United States Patent Office 3,150,961
Patented Sept. 29, 1964

3,150,961
PROCESS OF REDUCING METAL OXIDES
Fredrik Christen Collin, Ljan, Oslo, Norway, assignor to Elektrokemisk A/S, Oslo, Norway, a corporation of Norway
Filed Feb. 10, 1960, Ser. No. 7,795
Claims priority, application Norway, Feb. 14, 1959, 130,820
2 Claims. (Cl. 75—11)

In the commercial smelting of ores and metal oxides from slags in electric furnaces where the electrodes are submerged into the charge, one will as a rule obtain metals and alloys more or less saturated with carbon which in many cases must subsequently be decarbonized in two or three step processes.

The present invention relates to a method of smelting ores and slags, and particularly ores that contain iron oxides and some silica, in such a way that a relatively low carbon content is obtained.

According to the present invention if an ore is used it ordinarily will be combined with a carbonaceous reducing agent in a well known manner and be given a preliminary treatment whereby this charge is preheated and preferably more or less reduced. The methods of giving the ore such preliminary treatment is well known in the art as many such processes have been suggested. Slags may be simply preheated or may be supplied in molten state.

For carrying out the actual smelting operation I employ a covered furnace of the type in which the pot can be given a rotative movement while the cover and electrodes remain relatively stationary. The general type of such a furnace is shown for example in Ellefsen Patent No. 2,300,355 of October 27, 1942. In a furnace for carrying out the present invention special charging arrangements are made for it is a primary feature of my invention that I charge close to the electrodes and around them a mixture of burnt lime and carbon in substantially the proportion to form calcium carbide. Roughly speaking, this would mean that about 5 parts by weight of burnt lime would be supplied for slightly more than one part by weight of coke. The hot pretreated ore which still may contain some reducing agent, or the hot slag, is charged either around the periphery of the furnace or in the center of the furnace between the electrodes. At the same time the furnace is given a rotative movement (which may be either complete rotation or reciprocatory movement) sufficient to maintain the charged oxide containing material and the charged lime and carbon spread out approximately evenly in the furnace. The actual speed will vary widely with different details of charge, size, etc., but ordinarily the speed will be somewhat more rapid than that usually employed in such rotating furnaces and may vary from a speed equal to a full rotation in from 30 minutes to 24 hours.

When the furnace is charged in this manner, the oxide material melts and forms a layer of acid slag rich in metal oxide. At the same time the carbon and burnt lime charged around the electrodes react to form calcium carbide and this calcium carbide in turn reacts with the acid slag layer to reduce the metal oxides to the metallic state by continuous addition of a mixture of burnt lime and carbonaceous reducing agent near the electrodes. A continuous reduction of the ore by means of the carbide is obtained and a metal or alloy with medium or low carbon content is produced.

In the accompanying drawing I illustrate a furnace designed for carrying out this process.

Figure 1:
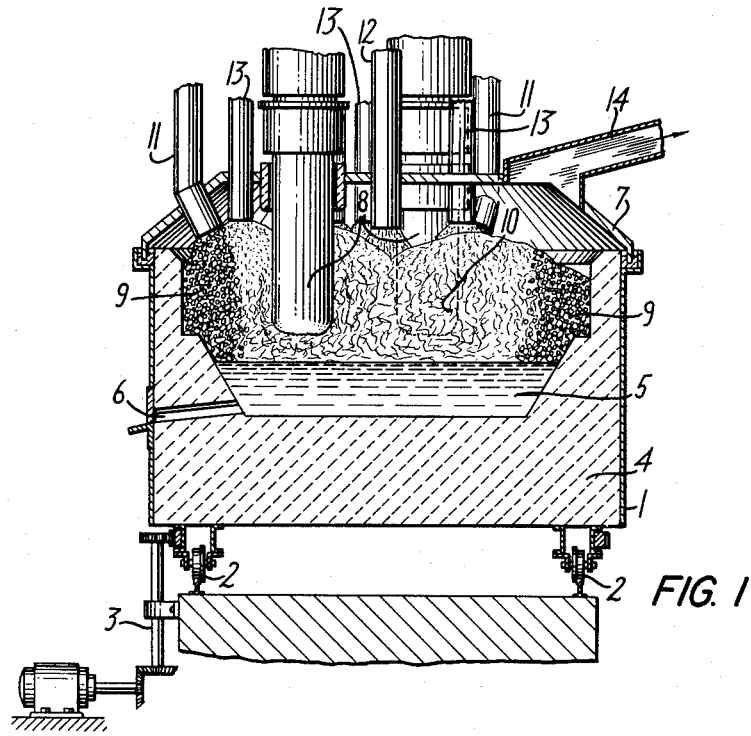
FIG. 1 shows a vertical section through the furnace.
Figure 2:
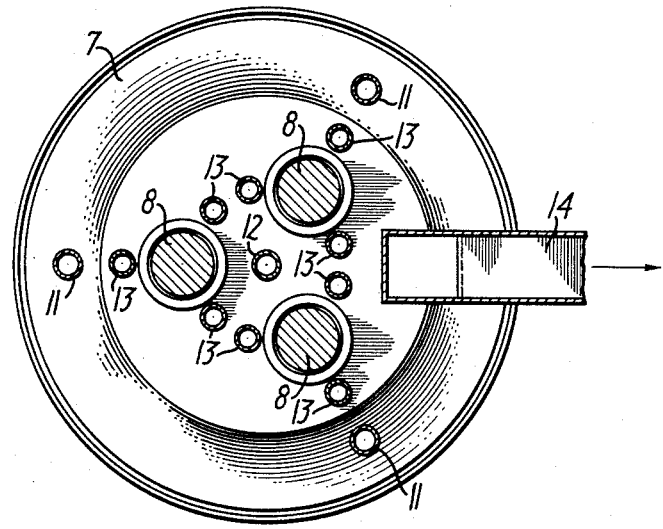
FIG. 2 shows a top view of the furnace with the electrodes shown in section.

The main body of the furnace is designated by the numeral 1, and this can be rotated by means of wheels 2. The driving mechanism is indicated by the numeral 3 and preferably this driving mechanism is so constructed that the speed of rotation of the furnace can be varied within the range previously specified.

As is usual, the furnace has a refractory lining 4 forming the furnace pot. In the drawing, 5 indicates the liquid molten bath. 6 is a tapping hole and 7 indicates the furnace cover which is stationary in relation to the rotating furnace body. 8 are the electrodes and 9 is the solid portion of the ore charge on top of the molten liquid bath 5 and extending above the tips of the electrodes and 10 indicates the charge of mixed carbon and burnt lime around the electrodes between the electrodes and the solid ore charge on top of the molten liquid bath.

The ore which has been preheated and preferably partially reduced in a separate furnace not shown in the drawings, or hot slag, is fed to the smelting furnace through chutes as indicated at 11 which are arranged in the furnace cover near the periphery of the furnace pot so that the ore or slag is charged along the furnace wall as indicated at 9. In this example a central chute 12 is also supplied through which the oxide containing mixture may be introduced into the furnace.

The carbide charge is supplied through the charge chutes 13 which lead this portion of the charge toward the electrodes between the solid ore charge and the electrodes to separate the ore charge from the electrodes. In the particular example illustrated nine such chutes are shown but it is understood that the number of charging chutes may vary according to size and operating conditions of the furnace. 14 indicates a gas outlet pipe.

To obtain a satisfactory even distribution of the charge with the charging chutes arranged as above described, the speed of rotation of the furnace pot must be adapted to the rate of smelting in the furnace. For commercial operation of a three-phase furnace with a load falling between 3,000 and 30,000 kw. the speed of movement of the furnace should be equal (as previously stated) to a speed of one rotation between 30 minutes and 24 hours. As this will have to be adjusted according to many factors it is advisable as pointed out above, that the mechanism for rotating the furnace be capable of variation at least within these limits. In operation the furnace should rotate fast enough so that the level of the charge along the circumference of the furnace and around the electrodes remains nearly constant.

For the purpose of illustration I give the following example of the use of the furnace specified:

In this case the charge was made up of a preformed slag from a copper reverberatory furnace. This slag contained about 55% FeO, about 30% $SiO_2$ and the remaining 15% consisted principally of CaO, $Al_2O_3$, ZnO and S. This slag was preheated and charged into the furnace around the periphery to chutes 11 and 12. For each 4700 lbs. of the slag (equal to 1 net ton of iron) there was charged through the chutes 13 a carbide charge made up of approximately 2500 lbs. of burnt lime and 550 lbs. of coke breeze. The furnace was rotated at a speed equal to 1 revolution in from 4 to 20 hours and the operation was carried on continuously with intermittent tapping so that the iron oxide of the charge was progressively reacted on by the calcium carbide to produce the desired iron.

In some instances the slag was broken up and preheated and in another case molten slag was charged into the furnace. In each instance an iron or semi-steel was produced having less than 5% carbon.

While this process may be employed for various types of iron ores or slags containing silica it has been found particularly valuable in treating slag resulting from the electrothermic production of high-carbon ferro manganese. This slag may have a content of MnO of 15%–50% and is used for the production of, for example "Spiegel" or silico manganese. When using this as a charging material the MnO slag can be charged continuously to one or more openings in the furnace cover near the circumference of the furnace while the ingredients of the calcium carbide are charged around the electrodes as pointed out above. In this way we have found it possible to obtain directly a medium carbon ferro manganese having from 1%–5% C.

In the same way the process may be employed for the production of other ferro alloys such for example as ferro chromium using ore or ore-coke mixtures which have been previously heated in a rotary kiln or shaft furnaces.

In smelting plants where finely divided lime and coke are available for example in the form of waste it will be advantageous to briquette or pelletize these together in the proportion corresponding to the formation of calcium carbide. These briquettes or pellets are then charged into the furnace through the chutes 13.

What I claim is:

1. A process of electric smelting of a preheated solid charge of iron oxides and silica in an electric furnace having a furnace pot with a top opening and with electrodes extending down into said top opening to produce metal iron in a molten metallic mass and an acid slag layer, said process comprising the steps of continually introducing preheated solid charge of iron oxides and silica into the furnace pot so as to fill space extending above the level of the tips of the electrodes with said charge, continually introducing into the furnace pot between the electrodes therein and the solid charge of iron oxides and silica a mixture of burnt lime and carbonaceous material in amounts proportioned for forming calcium carbide so as to fill space between the electrodes and the charge with said mixture thereby separating the charge from the electrodes to avoid saturation of the metal iron with carbon and to thereby obtain metal iron with a relatively low carbon content, supplying electric current to the electrodes to form calcium carbide in the vicinity of said electrodes and to reduce the iron oxide by reaction of said calcium carbide with iron oxide in the slag layer remote from said electrodes to produce metal iron with a relatively low carbon content, and causing rotative movement between said electrodes an said furnace pot at a speed determined by the rate of smelting in the furnace and between limits equivalent to one rotation of said pot from 30 minutes to 24 hours while introducing the charge and mixture to maintain the mixture and the charge uniformly distributed.

2. A process as specified in claim 1, in which the preheated charge also contains an oxide of metal adapted to alloy with the iron.

References Cited in the file of this patent

UNITED STATES PATENTS

| | | |
|---|---|---|
| 974,608 | Snyder | Nov. 1, 1910 |
| 1,484,670 | Petinot | Feb. 26, 1924 |
| 2,300,355 | Ellefsen | Oct. 27, 1942 |
| 2,523,092 | Bryk et al. | Sept. 19, 1950 |
| 2,830,891 | Udy | Apr. 15, 1958 |